United States Patent [19]

Enari et al.

[11] Patent Number: 4,862,292

[45] Date of Patent: Aug. 29, 1989

[54] DIGITAL INFORMATION SIGNAL RECORDING APPARATUS

[75] Inventors: Masahiko Enari; Katsuji Yoshimura, both of Kanagawa; Akio Aoki, Tokyo; Shinichi Yamashita; Makoto Shimokoriyama, both of Kanagawa; Motokazu Kashida, Tokyo; Tetsuya Shimizu, Kanagawa; Yoshiki Ishii, Kanagawa; Akio Fujii, Kanagawa, all of Japan

[73] Assignee: Canon Kabushiki Kaisha, Tokyo, Japan

[21] Appl. No.: 235,002

[22] Filed: Aug. 22, 1988

[30] Foreign Application Priority Data

Aug. 26, 1987 [JP] Japan .................................. 62-211733
Aug. 26, 1987 [JP] Japan .................................. 62-211735
Aug. 26, 1987 [JP] Japan .................................. 62-211736

[51] Int. Cl.$^4$ ........................... G11B 5/09; H04N 9/60
[52] U.S. Cl. .......................................... 360/8; 360/32; 360/23; 360/33.1; 360/9.1; 369/93; 358/3; 358/335; 358/88

[58] Field of Search ................... 360/32, 8, 9.1, 33.1, 360/21, 22, 23; 358/3, 88, 91, 92, 335; 369/86, 87, 88, 93

[56] References Cited

U.S. PATENT DOCUMENTS

| | | | |
|---|---|---|---|
| 3,975,764 | 8/1976 | Kobayashi et al. | 360/23 |
| 4,181,822 | 1/1980 | Workman | 360/23 |
| 4,329,718 | 5/1982 | Kimura | 360/23 |
| 4,393,418 | 7/1983 | Kimura | 360/22 |
| 4,437,128 | 3/1984 | Sapkowski | 360/22 |
| 4,611,250 | 9/1986 | Yoshinaka et al. | 358/335 |
| 4,614,980 | 9/1986 | Ninomiya et al. | 360/9.1 |
| 4,763,206 | 8/1988 | Takahaski et al. | 360/9.1 |

Primary Examiner—Alan Faber
Assistant Examiner—Kevin J. Fournier
Attorney, Agent, or Firm—Robin, Blecker & Daley

[57] ABSTRACT

A digital information signal recording apparatus has a first mode in which a digital information signal of one channel is recorded on a recording medium at a given bit rate and a second mode in which digital information signals of n channels (n: an integer which is at least 2) are simultaneously recorded on the recording medium at a bit rate which is 1/n of the given bit rate.

23 Claims, 12 Drawing Sheets

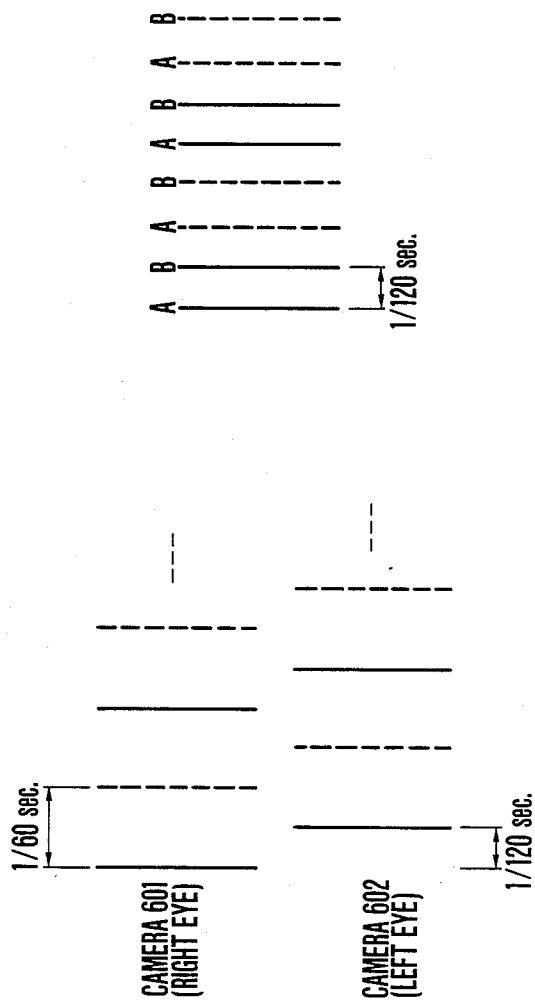

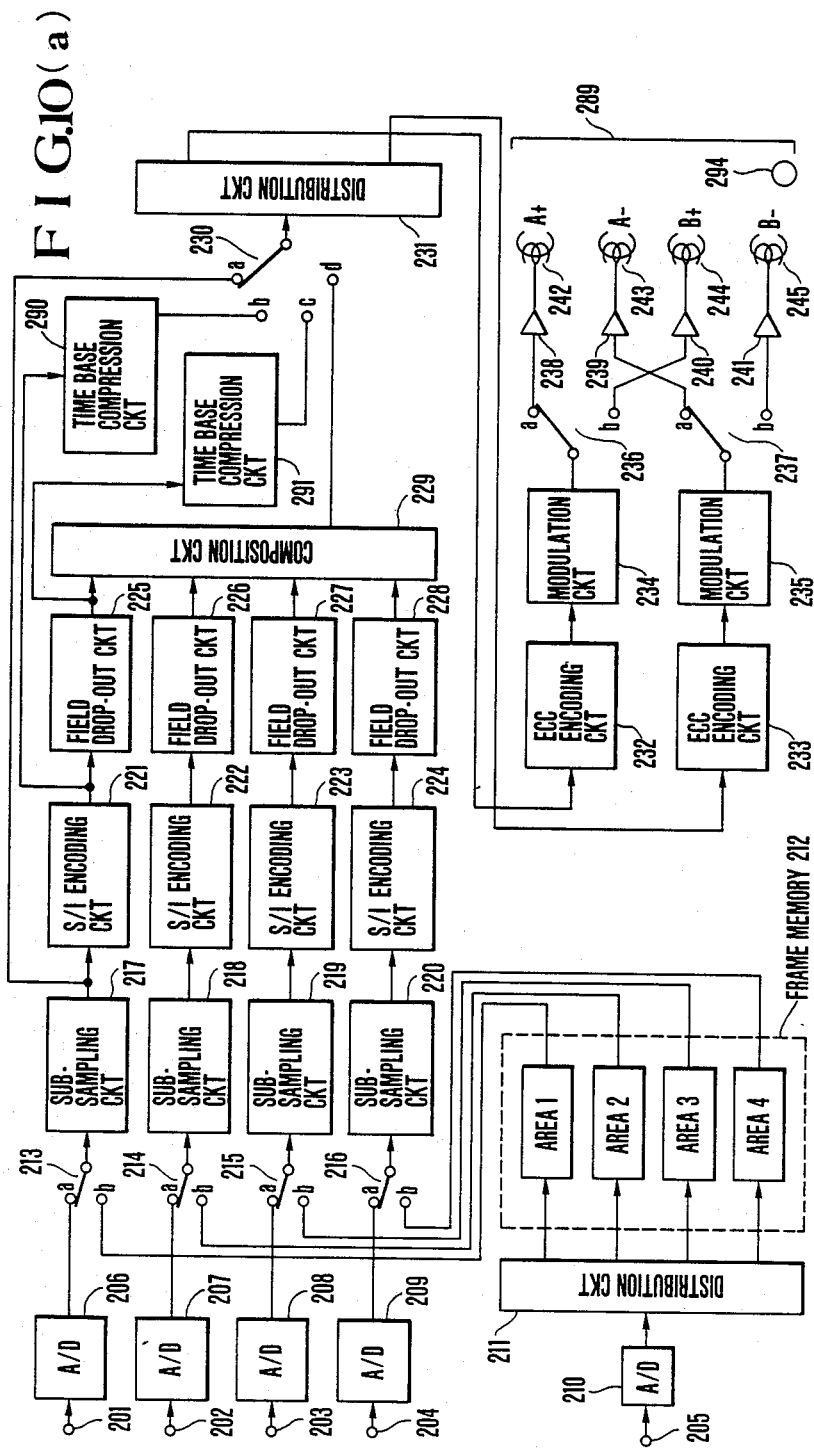

DIGITAL INFORMATION SIGNAL RECORDING APPARATUS

BACKGROUND OF THE INVENTION

1. Field of the Invention

This invention relates to a digital information signal recording apparatus and more particularly to a digital information signal recording apparatus which has a plurality of recording modes.

2. Description f the Related Art

A digital signal is restorable perfectly back to its original state if the S/N ratio thereof is above a certain given level. The signals of this kind are, therefore, considered to be advantageous for high quality recording and reproduction. For example, digital video recording is being performed by recording on a magnetic tape, a magnetic disc or an optical disc a digital video signal which is obtained through a digital pulse modulating process. In the case of a digital VTR for recording a video signal on a magnetic tape, the VTR is arranged to record a digital video signal at a track pitch at which the lowest allowable S/N ratio is obtainable. Since the track pitch cannot be allowed to be narrower than this, the VTR of this kind is arranged to cut down the amount of digital data (band compression) for an operation in the long-time recording mode that is practiced at present with the VTRs of the analog recording/reproducing type.

The technique for digital recording and reproduction and for a band compressing process has recently made a salient advancement. The digital VTR is capable of giving highly acceptable reproduced images even in the long-time mode. Since the long-time mode is advantageous in terms of efficient use of the magnetic tape, the long-time mode has come to be more frequently used. Meanwhile, the broadcasting programs have a great variety to stimulate a desire for recording a plurality of programs within one and the same time zone. At present, recording two different programs within one and the same time zone or within overlapping time zones necessitates the use of two VTRs.

Further, video signals have come to be allowed to have a higher degree of definition by high-definition cameras which are called high vision cameras and serve as high-definition television signal sources. However, there is no apparatus that is capable of recording or reproducing any high-definition television signal that is other than the signal of the NTSC system.

Meanwhile, it has been known to obtain a stereoscopic vision by allowing each of reproduced images of two channels to be observed only by corresponding one of the eyes of the observer. In this instance, the signals of two channels must be simultaneously recorded. Then, since the amount of image data must be divided into ½, it has been practiced to thin out the signal of each channel for every other field.

In case that an ordinary image is to be ,reproduced from a recording medium on which a stereoscopic image signal is recorded in the above stated manner, the thinned out field portion of the signal in one of the channels has been interpolated to retain an adequate image quality as the signal of one of the channels is thinned out not to have the vertical resolution thereof lowered to ½.

However, since the vertical resolution of the observable stereoscopic image is reduced to ½, the frame frequency is also reduced to ½. Therefore, the image reproduced in this manner in accordance with the conventional arrangement has a lower image quality with more flicker than ordinary images and thus causes a great visual fatigue when observed over a long period of time.

SUMMARY OF THE INVENTION

It is a general object of this invention to solve the above stated problems of the prior art.

It is a more specific object of the invention to provide a digital information signal recording apparatus which is capable of either recording a digital information signal of one channel or digital information signals of a plurality of channels by using one and the same recording means.

Under this object, a digital information signal recording apparatus arranged in one mode of embodying the invention comprises first signal generating means, for generating a digital information signal of one channel having a given bit rate; second signal generating means for generating digital information signals of n channels having a bit rate which is 1/n of the given bit rate, n being an integer which is at least 2; composition means for combining the digital information signals of n channels generated by the second signal generating means to generate a composite digital information signal of the given bit rate; selection means for selectively outputting one of the composite digital information signal and the digital information signal of one channel generated by the first signal generating means; and recording means for recording on a recording medium a digital signal output from the selection means.

It is another object of the invention to provide a digital information signal recording apparatus which is capable of recording any of digital information signals of a plurality of different kinds which greatly vary in bit rate by using one and the same recording means.

Under that object, a digital information signal recording apparatus arranged in another mode of embodying this invention comprises first input means for receiving a first digital information signal having a given bit rate; second input means for receiving a second digital information signal having a bit rate which is n times as high as the given bit rate, n being an integer which is at least 2; distributing means for distributing the second digital information signal received by the second input means into n channels; data compressing means for compressing to 1/n the amount of data of each of the digital information signals of n channels obtained by the distributing means; composition means for combining the digital information signals of n channels compressed by the data compressing means to generate a composite digital information signal of the given bit rate; selection means for selectively outputting one of the composite digital information signal and the digital information signal of one channel received by the first input means; and recording means for recording on a recording medium a digital signal output from the selection means.

Other objects and features of the invention will be apparent from the following detailed description taken in connection with the accompanying drawings.

BRIEF DESCRIPTION OF THE DRAWINGS

FIGS. 9(a) and 9(b) show display actions of the system of FIG. 8. FIG. 10(a) shows the arrangement of the recording system of a digital VTR arranged as another embodiment of the invention.

DETAILED DESCRIPTION OF THE PREFERRED EMBODIMENTS

Figure 1:
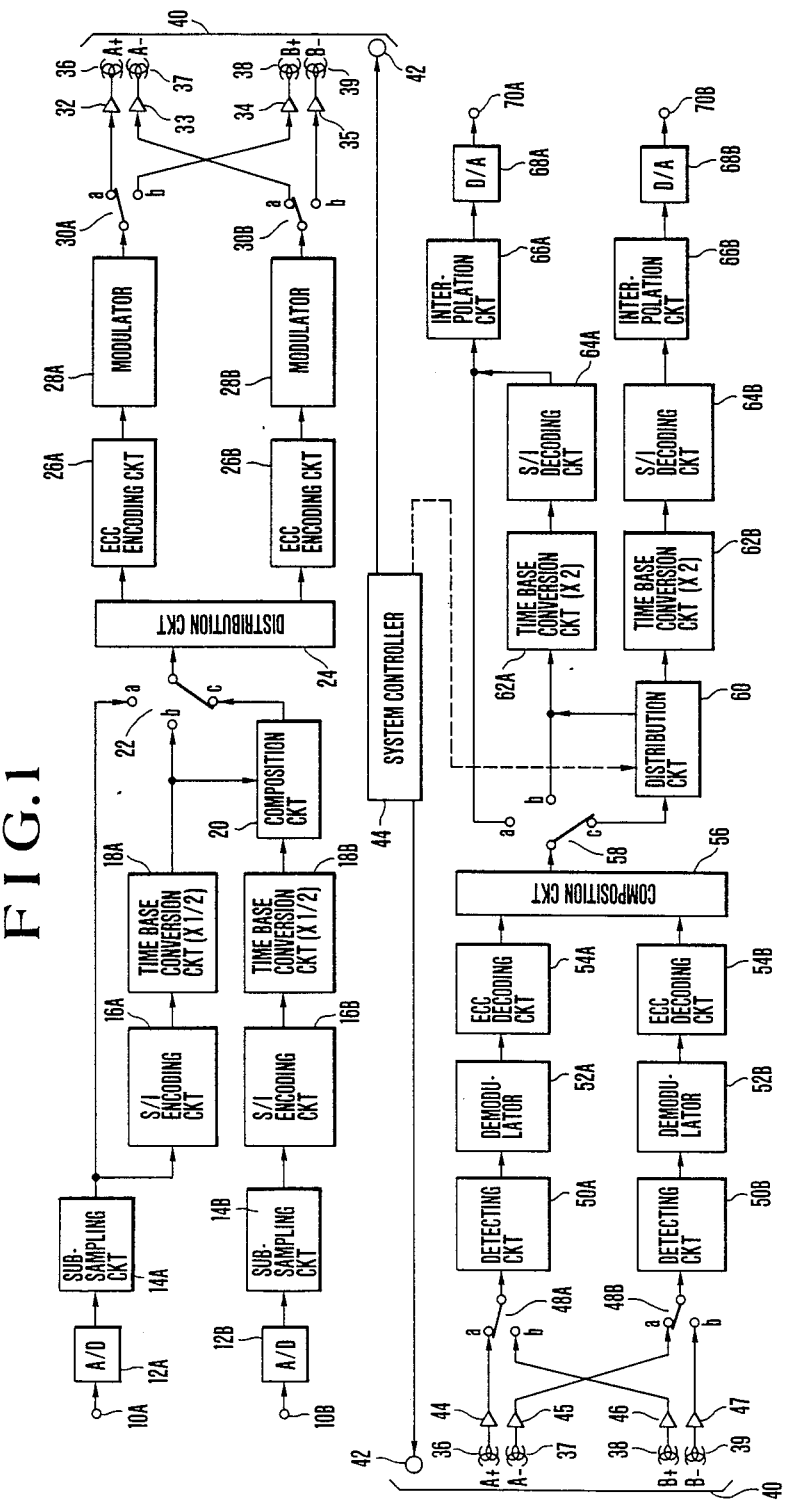
FIG. 1 is a diagram showing the arrangement of a digital VTR embodying this invention.

An embodiment of this invention is described with reference to the accompanying drawings as follows: FIG. 1 shows the arrangement of a digital VTR which is arranged according to this invention to permit simultaneous recording and simultaneous reproduction of video signals of two channels.

In a standard operation mode, the VTR operates as follows. In this mode, the connecting positions of switches 22 and 58 are on the side of their contacts a. An analog video signal which is received at an input terminal 10A is sampled by an A/D (analog-to-digital), converter 12A at a frequency of 4 fsc (fsc: the color subcarrier frequency of the NTSC system). The video signal is thus converted by the A/D converter 12A into a digital signal consisting of eight bits. The output of the A/D converter 12A is thinned down at a sub-Nyquist sampling circuit 14A by field offset-sampling or line offset-sampling. By this, the digital signal is compressed into a signal of a sampling rate of 2 fsc. The compressed signal is supplied to the contact a of the switch 22. A distribution circuit 24 distributes the signal coming from the switch 22 to two channels. The signals of the two channels thus obtained from the distribution circuit 24 are respectively supplied to switches 30A and 30B via ECC encoding circuits 26A and 26B and modulators 28A and 28B. The ECC encoding circuits 26A and 26B respectively performs processes including the addition of an error detecting/correcting code, interleaving, etc. The modulators 28A and 28B convert the signals into a signal form which is suited for digital recording having not much DC component.

Figure 2A:
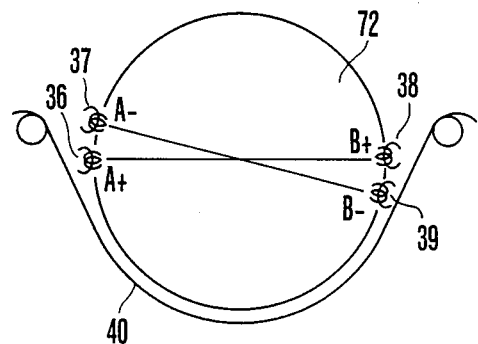
FIGS. 2(a) and 2(b) show the arrangement and positions of the heads of the digital VTR of FIG. 1.
Figure 2B:
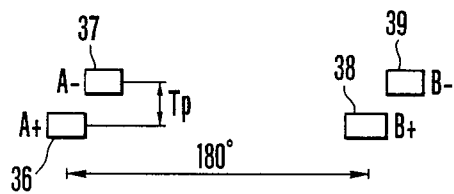
Figure 3A:
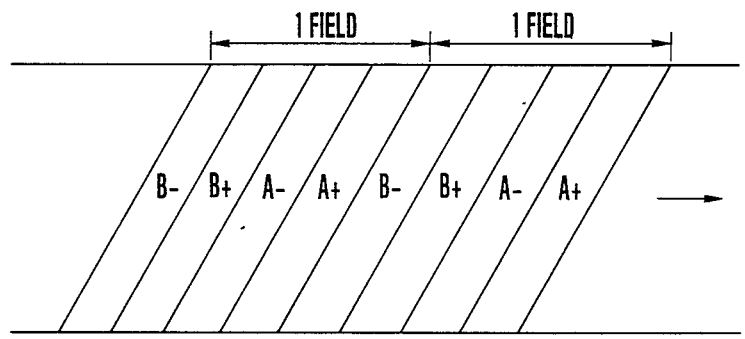
FIGS. 3(a) and 3(b) show recording patterns obtained on a tape by the digital VTR of FIG. 1 respectively.

The position of each of the switches 30A and 30B is arranged to be alternately shifted between contacts a and b in a cycle of 1/120 sec in the standard mode. The signals thus produced from these switches are amplified by recording amplifiers 32, 33, 34 and 35 and are then magnetically recorded on a magnetic tape 40 by means of magnetic heads 36, 37, 38 and 39. The magnetic heads 36 to 39 are disposed and arranged as shown in FIGS. 2(a) and 2(b). FIG. 2(a) is a plan view showing a rotary head drum 72 as viewed from above. FIG. 2(b) shows the allocation of the heads 36 to 39 as viewed from one side of the drum 72. The head 36 is paired with the head 37. The head 36 has a positive azimuth angle and the head 37 a negative azimuth angle. As shown in FIG. 2(b), they differ in height as much as one track pitch (Tp) from each other. The heads 38 and 39 are also in a relation similar to the relation between the heads 36 and 37. These two pairs of heads are arranged to revolve at a phase difference of 180 degrees. The rotary drum 72 is arranged to rotate at 3,600 rpm. Meanwhile, a magnetic tape 40 is wrapped about 180 degrees around the periphery of the drum 72. In the standard mode, therefore, one field portion of the video signal having a field frequency of 60 Hz is recorded in four tracks as shown in FIG. 3(a).

In reproducing the video signal which is thus recorded in the standard mode, the VTR operates as follows: Signals reproduced from the magnetic tape 40 by the magnetic heads 36 to 39 are applied via reproduction amplifiers 44 to 47 to switches 48A and 48B respectively. Each of the switches 48A and 48B is arranged to shift its position between contacts a and b in a cycle of 1/120 sec in the same manner as in the case of recording. Each of detecting circuits 50A and 50B consists of a wave-form equalizing part, a clock signal reproducing part and a discrimination part. The discrimination part is arranged to make a discrimination between "0" and "1" by performing voltage comparison at the bit time obtained from the clock signal reproducing part. Demodulators 52A and 52B are arranged to demodulate the outputs of the detecting circuits 50A and 50B. ECC decoding circuits 54A and 54B are arranged to perform an error detecting/correcting process and a deinterleaving process. A composition circuit 56 is arranged to combine the outputs of the ECC decoding circuits 54A and 54B into a signal of one channel. In the standard mode, the connecting position of a switch 58 is on the side of its contact a. The output of the composition circuit 56 is supplied to an interpolation circuit 66A. The interpolation circuit 66A interpolates the thinned out parts of the signal resulting from the above stated sub-sampling. The interpolated signal is then converted into an analog signal by a D/A (digital-to-analog) converter 68A. The analog signal thus obtained is output from an output terminal 70A.

Next, the operation of the VTR in a long-time mode is described as follows: In that mode, the connecting positions of the switches 22 and 58 are on the side of their contacts b respectively. An analog video signal received at the input terminal 10A is supplied to the A/D converter 12A and the sub-sampling circuit 14A to be subjected to the same processes as in the case of the standard mode. The signal thus processed is then applied to a scale/index (S/I) encoding circuit 16A. The S/I encoding circuit 16A is arranged to perform a so-called block encoding action. For this action, a method called the MIN-MAX method is popular. In accordance with the MIN-MAX method, an image is divided into blocks of picture elements. A part between maximum and minimum values of each block is equally divided and quantized. An index indicating to which of the quantization levels each of the picture elements belongs is transmitted. In addition to that, the maximum and minimum values are also transmitted as scale components. This method enables a representative value of quantization to be reproduced on the signal receiving side.

For example, 16 (4×4) picture elements are handled as one block; the maximum and minimum values within each block are arranged to be the scale components each consisting of eight bits; and an index which consists of three bits and obtained by dividing a part between the maximum and minimum values into eight is assigned to every one of the 16 picture elements. By this arrangement, the amount of data of 128 bits/block which is obtained by quantizing every one of the 16 picture elements with eight bits can be carried by 64 (=2×8+16×3) bits/block which is one half of 128 bits.

Figure 6:
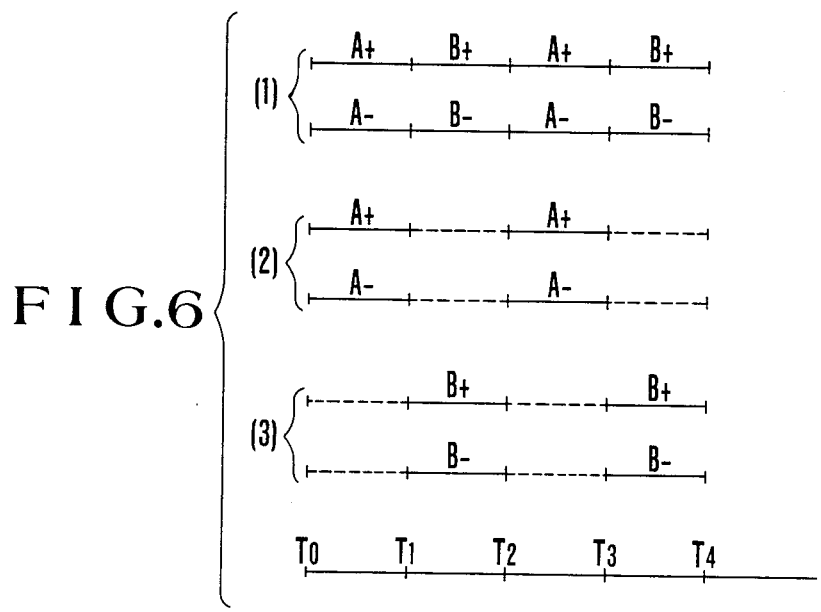
FIG. 6 is a timing chart showing the operation of the digital VTR of FIG. 1.

With its amount of data reduced to one half by the S/I encoding circuit 16A, the signal is supplied to a time base conversion circuit 18A to be time base compressed by half. The output of the circuit 18A is applied via the contact b of the switch 22 to the distribution circuit 24. The distribution circuit 24 then, distributes the input signal to two signal processing systems. Then, the ECC encoding circuits 26A and 26B add error detecting/correcting codes to the output of the distribution circuit 24 and perform other processes such as interleaving, etc. The outputs of the encoding circuits 26A and 26B are intermittently produced according to a recording rate. For example, with the rotational frequency of the head drum 72 assumed to be 3,600 rpm and to be constant, a signal which is produced at a timing (1) of FIG. 6 in the standard mode comes to be intermittently produced at a timing (2) as shown in FIG. 6 in the long-time mode. As a result, the signal is recorded solely by the pair of heads 36 and 37. The outputs of the ECC encoding circuits 26A and 26B are modulated by the modulators 28A and 28B in the same manner as in the case of the standard mode. The outputs of the modulators 28A and 28B are applied to switches 30A and 30B.

The connecting position of each of the switches 30A and 30B is repeatedly shifted between the contact a and a non-connecting point in a cycle of 1/60 sec in conformity with the output timing of the ECC encoding circuit 26A or 26B. Signals from the contacts a of the switches 30A and 30B are applied via the recording amplifiers 32 and 33 to the magnetic heads 36 and 37 to be recorded on the magnetic tape 40.

Figure 3B:
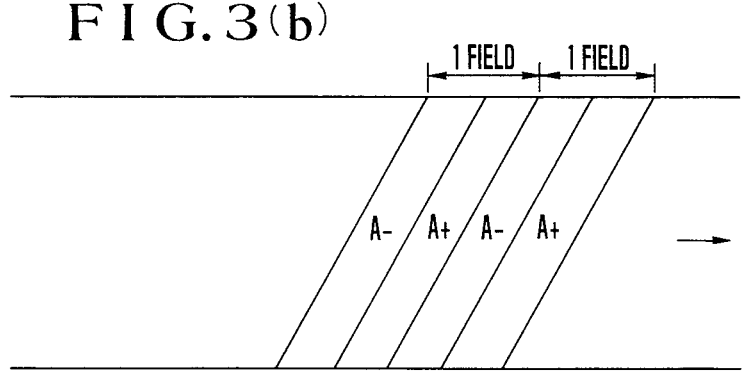

Further, in the long-time mode, a system controller 44 produces an instruction which causes a capstan motor 42 to rotate at a speed which is ½ of the speed of the standard mode. Then, a recording format obtained on the magnetic tape 40 becomes as shown in FIG. 3(b).

In reproducing the signal which was recorded in the long-time mode in the manner as described above, the VTR uses the heads 36 and 37 only. The signals reproduced by the heads are applied to the contacts a of the switches 48A and 48B via the reproduction amplifiers 44 and 45. The signals are then supplied to the composition circuit 56 respectively via the detecting circuits 50A and 50B, the demodulators 52A and 52B and the ECC decoding circuits 54A and 54B. Each of the ECC decoding circuits 54A and 54B performs error detecting/correcting and deinterleaving processes. The signals thus processed is supplied to the composition circuit 56. The composition circuit 56 combines these signals into one signal. The signal is then applied to a time base conversion circuit 62A via the contact b of the switch 58. The time base conversion circuit 62A then expands the time base of the signal by two times and produces data as a result of this. The data produced from the circuit 62A is supplied to a scale/index (S/I) decoding circuit 64A. The circuit 64A then decodes the data into a value of eight bits per sample and produces it after block-raster conversion. The interpolation circuit 66A interpolates the data thinned out by the sub-sampling circuit 14A. The D/A converter 68A then converts the output of the interpolation circuit 66A into an analog, signal and produces it to the output terminal 70A.

In a two-channel input recording mode, the VTR simultaneously records input signals of two channels. In the case of this mode, the connecting positions of the switches 22 and 58 are on the side of their contacts c. A video signal received at the input terminal 10A is processed in the same manner as in the case of the long-time mode by the A/D converter 12A, the sub-sampling circuit 14A, the S/I encoding circuit 16A and the time base conversion circuit 18A. The video signal thus processed is supplied to the composition circuit 20. Another video signal which is received at the input terminal 10B is also processed in the same manner as the video signal received at the input terminal 10A by the A/D converter 12B, the sub-sampling circuit 14B, the S/I encoding circuit 16B and the time base conversion circuit 18B. The video signal thus processed is also supplied to the composition circuit 20. This composition circuit 20 consists of a switching circuit and is arranged to combine the two video signals into a composite signal. The composite video signal has the same data rate as in the case of the standard mode. The video signal is then supplied to the distribution circuit 24 to be subjected to processing actions performed in the same manner as in the case of the standard mode by the distribution circuit 24 and ensuing circuit elements.

The video signal of the input terminal 10A is supplied to the pair of heads 36 and 37 while the video signal of the other input terminal 10B is supplied to the pair of heads 38 and 39. In other words, the composition circuit 20 obtains the signal of the data rate of the standard mode as shown at the timing chart part (1) of FIG. 6 by switching the signal of the input terminal 10A which is as shown at the timing chart part (2) of FIG. 6 over to the signal of the input terminal 10B which is as shown at another timing chart part (3) of FIG. 6 and vice versa in such a manner that the signal of the input terminal 10B is supplied while the signal of the input terminal 10A is not supplied (i.e. during the periods of time between time points T1 and T2, between time points T3 and T4, .... The recording format on the magnetic tape is the same as in the case of the standard mode as shown in FIG. 3(a).

In reproducing the signal thus recorded, the signal processing actions are performed in the same manner as in the case of the standard mode by the circuit elements from the heads 36 to 39 up to the composition circuit 56. The output of the composition circuit 56 is supplied to a distribution circuit 60 via the contact c of the switch 58. The distribution circuit 60 is composed of a switching circuit. The circuit 60 supplies the signal reproduced by the heads 36 and 37 to a time base conversion circuit 62A and the signal reproduced by the heads 38 and 39 to another time base conversion circuit 62B. The time base conversion circuit 62B expands the time base of the reproduced signal by two times and supplies it to an S/I decoding circuit 64B. The circuit 64B, an interpolation circuit 66B and a D/A converter 68B perform processing actions on the time base expanded signal in the same manner as in the case of the long-time mode. The signal thus processed is produced to an output terminal 70B. Meanwhile, the signal which is time base expanded by two times at a time base conversion circuit 62A is processed by an S/I decoding circuit 64A, an interpolation circuit 66A and a D/A converter 68A in the same manner as in the case of the long-time mode before it is produced to an output terminal 70A.

Figure 4:
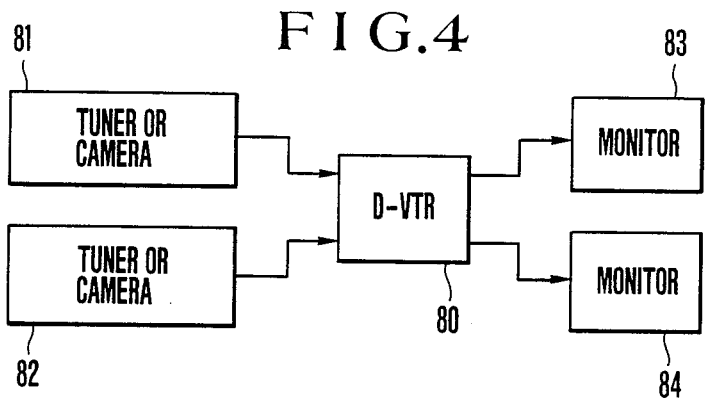
FIGS. 4 and 5 show examples of system arrangement including the digital VTR of FIG. 1.
Figure 5:
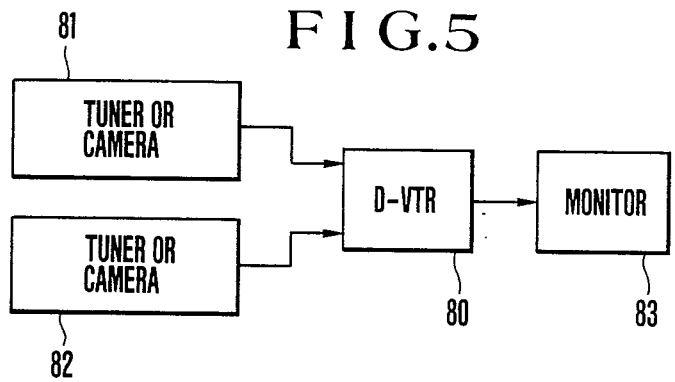

FIG. 4 shows a system obtained by connecting, to the digital VTR 80 which is the embodiment of this invention shown in FIG. 1, two tuners or cameras 81 and 82 as an input device and two monitors 83 and 84 as an output device. FIG. 5 shows another system which is obtained by changing the system of FIG. 4 by connecting one monitor 83 instead of two as the output device. Each of these systems is arranged to have the digital VTR 80 operate in a two-channel input mode to record two input signals on a magnetic tape. In reproducing the record, the system of FIG. 4 operates in a two channel reproduction mode to display reproduced images on the two monitors 83 and 84 respectively. Whereas in the case of the system of FIG. 5, the single monitor 83 is connected to either the reproduction output terminal 70A or 70B, so that one of the reproduced images can be displayed. One of the reproduced images is thus displayed by selectively connecting the monitor to one of the output terminals. Further, with the monitor 83 thus connected to the output terminal 70A of FIG. 1, the single monitor unit can be arranged to select the output of any of the two channels by supplying the time base conversion circuit 62A either selectively or alternatively with the signals reproduced by the pair of heads 36 and 37 and the other pair of heads 38 and 39.

As apparent from the foregoing description, the digital VTR according to this invention is capable of performing optimum recording and reproduction by using one and the same recording/reproducing part either for the input signals of a plurality of channels or for a single channel input signal.

Figure 7:
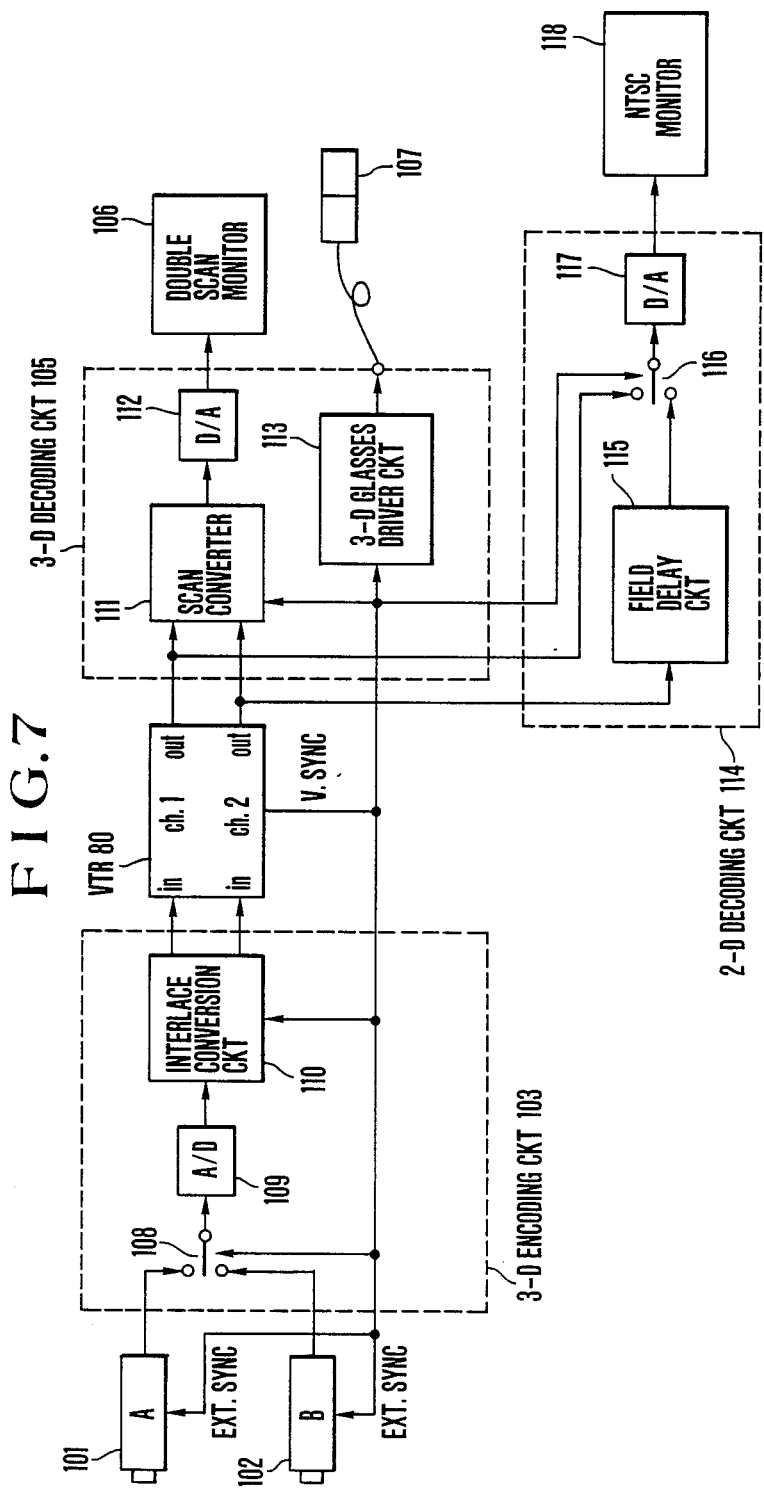
FIG. 7 shows another example of system arrangement including the digital VTR of FIG. 1.

Another system including the digital VTR of FIG. 1 is arranged as follows: FIG. 7 shows the arrangement of a stereoscopic image recording/reproducing system using the digital VTR of FIG. 1. Referring to FIG. 7, double scan cameras 101 and 102 are arranged to supply a 3-D (three-dimensional) encoding circuit 103 with an image signal of 525 lines × 60 frames/sec (hereinafter referred to as a double-scan signal) in accordance with a vertical synchronizing (hereinafter referred to as sync for short) signal which is supplied from the system controller 44 through a route not shown in FIG. 1. Within the 3-D encoding circuit 103, a selection circuit 108 makes a switch-over selection between two double-scan, signals for every frame. The signals are converted into digital signals by an A/D converter 109 and are then supplied to an interlace conversion circuit 110. The circuit 110 then converts the double-scan signals in an interlacing manner into an odd-number field signal and an even-number field signal. Then, these signals are supplied to the input terminals of the digital VTR 80. For example, the odd-number field signal is supplied to a channel 1 and the even-number field signal to a channel 2. In other words, the frame signal which is produced from one of the double-scan cameras 101 and 102 and is selected by the 3-D encoding circuit 103 is divided into the channels 1 and 2. The digital VTR 80 then simultaneously records them. The details of the simultaneous recording will be described later.

The two signals which are reproduced by the VTR 80 are supplied to a 3-D decoding circuit 105. The reproducing action of the VTR 80 will be described later. At the 3-D decoding circuit 105, the reproduced signals of the two channels which are field-divided double-scan signals coming from the VTR 80 are converted into a double scan signal of one frame at a scan converter 111.

Then, the output of the scan converter 111 is converted into an analog double-scan signal by a D/A converter 112. The analog double-scan signal is supplied to a double-scan monitor 106. The 3-D decoding circuit 105 includes a 3-D glasses driver circuit 113 which is arranged to drive 3-D glasses 107 in accordance with a vertical sync, signal coming from the VTR 80. The 3-D glasses 107 is a stereoscopic image observing device equipped, for example, with discrete liquid crystal shutters on the right and left sides thereof. The right shutter opens, for example, when the image obtained from the camera 101 is displayed on the monitor 106. The left shutter opens when the image obtained from the other camera 102 is displayed on the monitor 106. The 3-D glasses 107 thus cause the images obtained by the cameras 101 and 102 to be discretely and independently incident upon the left and right eyes of the observer.

In cases where an image recorded as a stereoscopic image is to be reproduced on an ordinary image plane, a 2-D (two-dimensional) decoding circuit 114 is used. Within the 2-D decoding circuit 114, a selection circuit 116 makes a switch-over selection for every field portion between the output of the channel 1 and a signal obtained by delaying the output of the channel 2 for a one-field period through a field delay circuit 115. By this, either the image obtained by the camera 101 or the image obtained by the other camera 102 can be taken out as an interlaced signal. This interlaced signal is converted by a D/A converter 117 into an analog signal. The analog signal is applied to an NTSC monitor 118.

The system arranged as described above enables the VTR 80 to record a stereoscopic image with a three dimensional depth by obtaining images from the double scan cameras 101 and 102 which are spaced, for example, at a distance equal to the parallax of the right and left eyes of the observer. Further, while the conventional stereoscopic image display device has been arranged to give a reproduced field image display with a vertical resolution of 262.5 lines for each of the eyes, the embodiment of this invention described above gives a reproduced frame image with a vertical resolution of 525 lines for each of the eyes. The embodiment is thus capable of giving a high quality stereoscopic image without deteriorating the vertical resolution.

Figure 8:
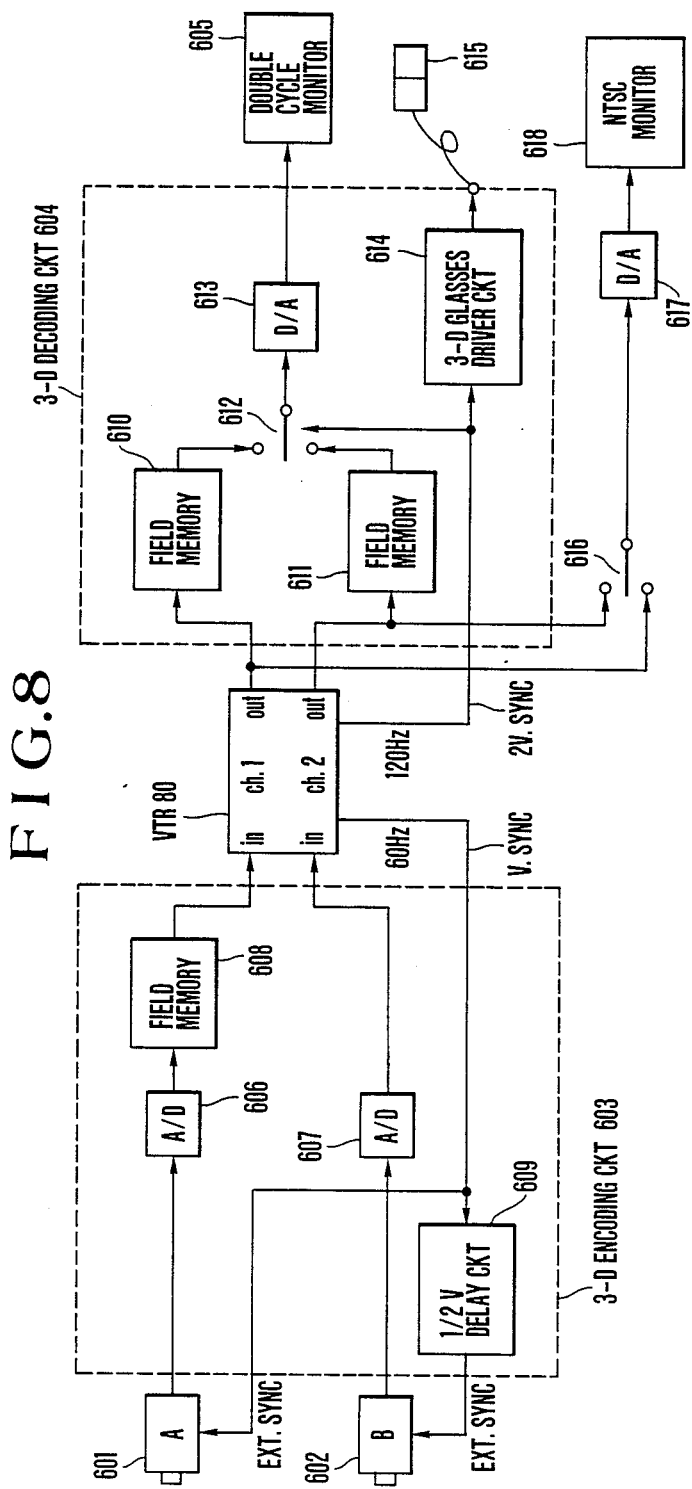
FIG. 8 shows a further example of system arrangement including the digital VTR of FIG. 1.

FIG. 8 shows a system including two cameras each of which produces an image signal at a rate of 262.5 lines × 60 field/sec (hereinafter referred to as an NTSC signal). The system is thus arranged to record or display an image at a rate of 262 × 120 fields/sec by using the digital VTR 80 of FIG. 1 in combination with these cameras.

Referring to FIG. 8, in accordance with the sync signal supplied from a 3-D encoding circuit 603, the cameras 601 and 602 which are of the NTSC system supply NTSC signals to the 3-D encoding circuit 603. In this instance, the sync signal which is supplied to the camera 602 is delayed as much as ½ field period by a delay circuit 609. As a result, the field signals produced from the cameras 601 and 602 are deviating as much as 1/120 sec from each other as shown in FIG. 9(a). The NTSC signals from the cameras are supplied to a 3-D encoding circuit 603. At the 3-D encoding circuit, 603, the NTSC signals are converted into digital signals by A/D converters 606 and 607. The output of the A/D converter 606 is delayed by a field memory 608 as much as a 1/120 sec portion thereof. This delay enables the output signals of the cameras 601 and 602 to be applied to and recorded by a digital VTR 80 in synchronism with each other. The digital VTR 80 is arranged in the same manner as in FIG. 1.

In carrying out stereoscopic image reproduction, the two outputs of the digital VTR 80 are supplied to a 3-D decoding circuit 604. At the 3-D decoding circuit 604, each of the two channel signals is time base compressed to ½. The time base compressed signals are stored by field memories 610 and 611 for shifting the output timing of them by 1/120 sec. After that, in accordance with a vertical sync signal which is produced from the digital VTR 80 in a double cycle, a selection circuit 612 makes a switch-over selection of them for every field to give a double cycle signal. The double cycle signal is applied to a D/A converter 613. The D/A converter 613 then produces an analog signal, which is supplied to a double cycle monitor 605 having 262.5 lines ×120 fields/sec. The switch-over action of the selection circuit 612 is performed in a manner corresponding to the delaying elation obtained between the camera outputs in taking them in, i.e., in recording them by the VTR 80. As a result, the double cycle monitor 605 makes a display in a manner as shown in FIG. 9(b).

The 3-D decoding circuit 604 includes a 3-D glasses driver circuit 614. The driver circuit 614 drives and controls 3-D glasses 615 in accordance with the double cycle vertical sync signal obtained from the VTR 80. The 3-D glasses 615 opens and closes a right eye shutter and a left eye shutter in synchronism with the switch-over action of the selection circuit 612 in such a way as to enable the observer to see a reproduced image in a state as shown in FIG. 9(a).

In case that a reproduced image is to be observed in an ordinary image state, either of the two channel outputs is selected by a selection circuit 616. The signal selected is converted into an analog signal by a D/A converter 617. Then the analog signal is applied to an NTSC monitor 618. In the case of the system of FIG. 8, the image to be observed with one eye is obtained at a rate of 262.5 lines .60 fields/sec which is the same as the NTSC system which is now generally employed. This gives a stereoscopic image display without much flickers.

Further, with a plurality of signals which are obtained in consideration of the two eye parallax simultaneously recorded, such a signal as a computer graphic image can be three-dimensionally displayed. Further, the use of a projector display or the like that is capable of making a simultaneous display by applying polarization to channels separately from each other enables the observer to see a stereoscopic image using, a polarized glasses having different polarizing angles between the right and left sides.

Figure 10B:
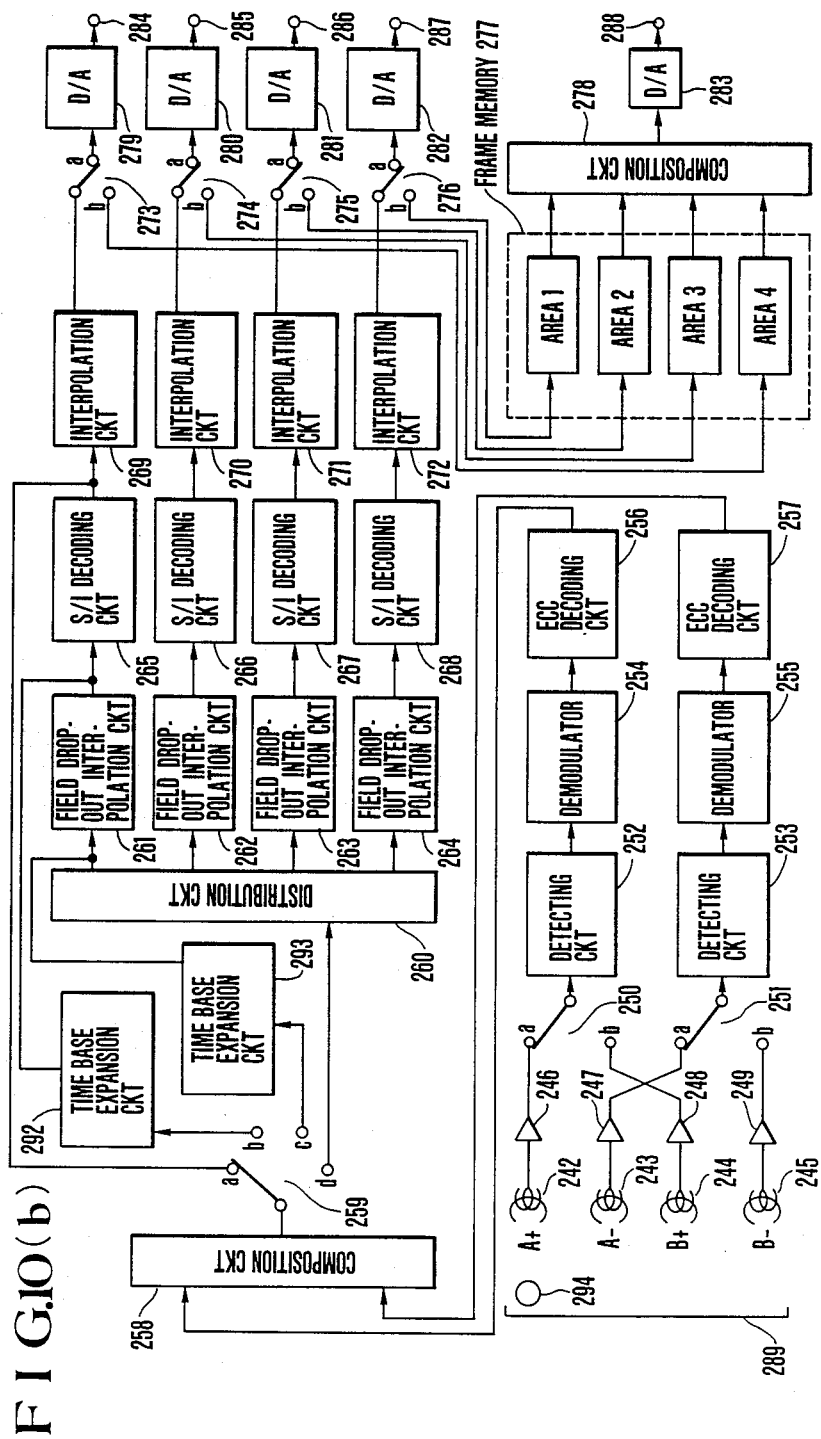
FIG. 10(b) shows the arrangement of the reproducing system of the digital VTR of FIG. 10(a).

A digital VTR embodying this invention as another embodiment thereof is arranged as follows: FIGS. 10(a) and 10(b) are block diagrams showing the recording and reproducing systems of the digital VTR respectively. The different operation modes of the VTR will be described in the order of a high picture quality mode, a standard mode, a long-time mode, a four-channel mode and an HD (high-definition television) mode.

I. High Picture Quality Mode: The connecting positions of switches 213 to 216, 230, 259 and 273 to 276 are respectively on the side of their contacts a. An input video signal received at an input terminal 201 is sampled by an A/D converter 206 at a frequency of 4 fsc (fsc: the color subcarrier frequency of the NTSC system). The input video signal is thus converted into a digital signal of eight bits. The digital signal is thinned out at a sub-sampling circuit 217 by a field offsetting or line offsetting process to be thus compressed to a signal obtained at a sampling rate of 2 fsc. The compressed signal is supplied to the contact a of the switch 230. A distribution circuit 231 is arranged to receive this signal from the switch 230 and to distribute the signal to two channels. The signals of the two channels distributed by the distribution circuit 231 are supplied to ECC encoding circuits 232 and 233 to be subjected to an error detecting/correcting process,, an interleaving process, etc. The signals thus processed are supplied to modulation circuits 234 and 235 to be converted into signals which do not have much DC components and are suited for digital recording. The signals thus modulated are supplied to the switches 236 and 237.

Figure 11A:
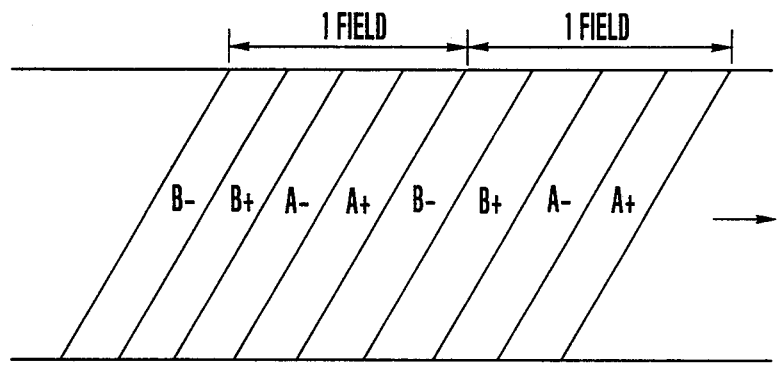
FIGS. 11(a), 11(b) and 11(c) show recording patterns obtained on a tape by the digital VTR of FIG. 10(a).

The connecting position of each of the switches 236 and 237 alternately shifts between contacts a and b in a cycle of 1/120 sec. The signals allowed to pass through the switches 236 and 237 are amplified by recording amplifiers 238 to 241. The amplified signals are magnetically recorded on a magnetic tape 289 by magnetic heads 242 to 245. The magnetic heads 242 to 245 are arranged in the same manner as the heads 36 to 39 of FIG. 1 also in respect of the azimuth angle as well as in respect of their relative positions. Therefore, in the high picture quality mode, one field portion of a video signal having a field frequency of 60 Hz is recorded in four tracks as shown in FIG. 11(a).

In performing a reproducing operation, signals reproduced by the magnetic heads 242 to 245 are applied via reproduction amplifiers 246 to 249 to switches 250 and 251. The connecting positions of the switches 250 and 251 are arranged to be changed over between contacts a and b in a cycle of 1/120 sec in the same manner as in recording. The signals allowed to pass through these switches are supplied to detecting circuits 252 and 253. Each of the detecting circuits 252 and 253 consists of a wave form equalizing part, a clock signal reproducing part and a discrimination part. The discrimination part makes a discrimination between "0" and "1" by performing voltage comparison at a bit time obtained from the clock signal reproducing part. Demodulators 254 and 255 are arranged to demodulate the outputs of the detecting circuits 252 and 253. ECC decoding circuits 256 and 257 are arranged to perform an error detecting/correcting process and a deinterleaving process on the outputs of the demodulators 254 and 255. The outputs of the ECC decoding circuits 256 and 257 are supplied to a composition circuit 258. The circuit 258 combines the outputs of the decoding circuits 256 and 257 into a single channel signal. The connecting position of a switch 259 is on the side of one contact a thereof in the high picture quality mode. The signal from the composition circuit 258 is thus allowed to be supplied to an interpolation circuit 269. The interpolation circuit 269 then interpolates the thinned out sampling points of the signal. The signal thus interpolated is produced from an output terminal 284 via a switch 273 and a D/A converter 279.

II. Standard Mode: The connecting positions of the switches 230 and 259 are on the side of their contacts b. Those of the switches 213 to 216 and 273 to 276 are respectively on the side of their contacts a. An input video signal received at the input terminal 201 is supplied to the A/D converter 206 and the sub-sampling circuit 217 to be subjected to the same processes as in the case of the high picture quality mode. After that, the signal is applied to an S/I encoding circuit 221 which is similar to the circuits 16A and 16B of FIG. 1.

Figures 12A, 12B, 12C:
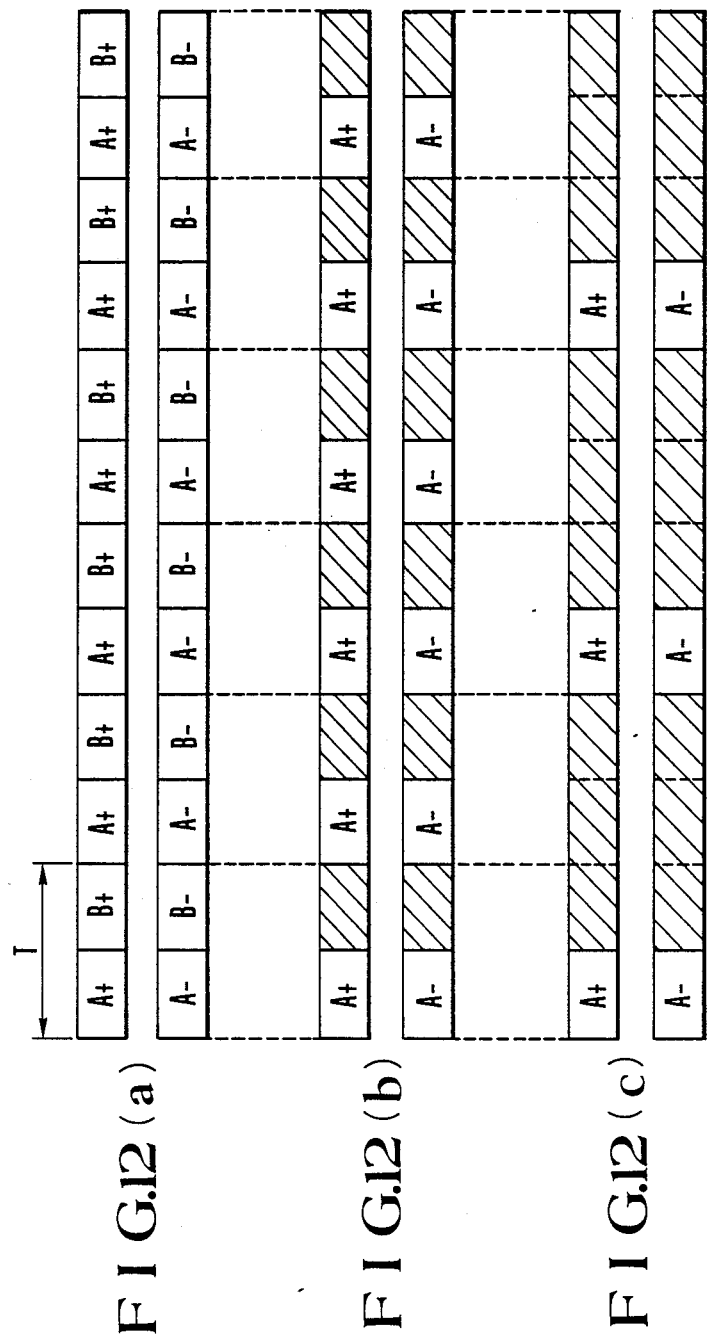
FIGS. 12(a), 12(b) and 12(c) are timing charts showing the operation timing of the heads of the digital VTR of FIGS. 10(a) and 10(b).

The S/I encoding circuit 221 reduces the amount of data of the signal to one half thereof. The signal is then supplied to a time base compression circuit 290 to have its time base compressed to ½. The compressed signal is applied via the contact b of the switch 230 to the distribution circuit 231. The circuit 231 then distributes the input signal to two channels. The two channel outputs of the distribution circuit 231 are subjected to the same process as the process mentioned in the foregoing at ECC encoding circuits 232 and 233. The distribution circuit 231 intermittently produces digital signals. For example, with the rotational frequency of each head assumed to be 3,600 rpm and constant, a digital signal is intermittently read out as shown in FIG. 12(b) and is recorded only by the pair of heads 242 and 243. The outputs of the ECC encoding circuits 232 and 233 are modulated by modulation circuits 234 and 235 in the same manner as in the case of the high picture quality mode. The modulated signals are applied to switches 236 and 237.

Figure 11B:
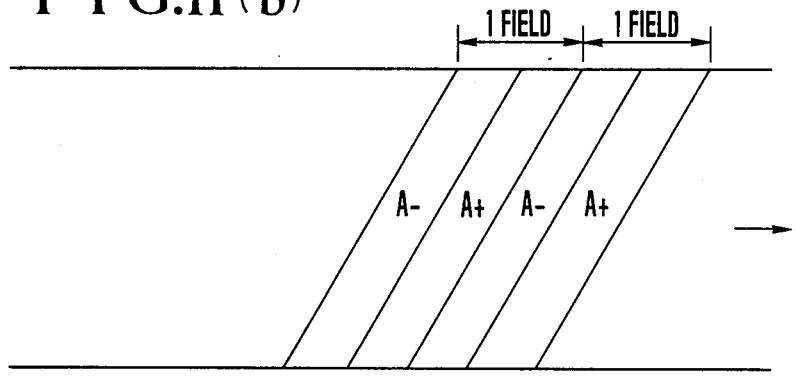

The connecting position of each of the switches 236 and 237 is repeatedly shifted between a contact a and a non-connecting position thereof. The outputs of the switches 236 and 237 are applied via recording amplifiers 238 and 239 to the magnetic heads 242 and, 243 to be recorded on the magnetic tape 289. A system controller (not shown) produces an instruction to cause a capstan motor 294 to rotate at a speed which is ½ of the speed obtained in the high picture quality mode. The format of recording on the magnetic tape 289 is as shown in FIG. 11(b).

In reproducing the signal recorded in the standard mode, only the heads 242 and 243 are used. Signals reproduced by these heads are applied via the reproduction amplifiers 246 and 247 to the contacts a of switches 250 and 251. The switches supply these signals to a composition circuit 258 via detecting circuits 252 and 253, demodulators 254 and 255 and ECC decoding circuits 256 and 257. The ECC decoding circuits 256 and 257 perform error detecting/correcting and deinterleaving processes on the signals before they are applied to the composition circuit 258. The composition circuit 258 then produces a signal, which is applied to a time base expansion circuit 292 via the contact b of a switch 259. The time base of the signal is expanded by two times at the circuit 292. The output data of the time base expansion circuit 292 is supplied to an S/I decoding circuit 265 to be decoded into a value of having eight bits per sample. The decoded data is block-raster converted before it is produced. An interpolation circuit 269 interpolates the data thinned out by the sub-sampling circuit 217. A D/A converter 279 converts the interpolated data into an analog signal and supplies it to an output terminal 284.

Figure 11C:
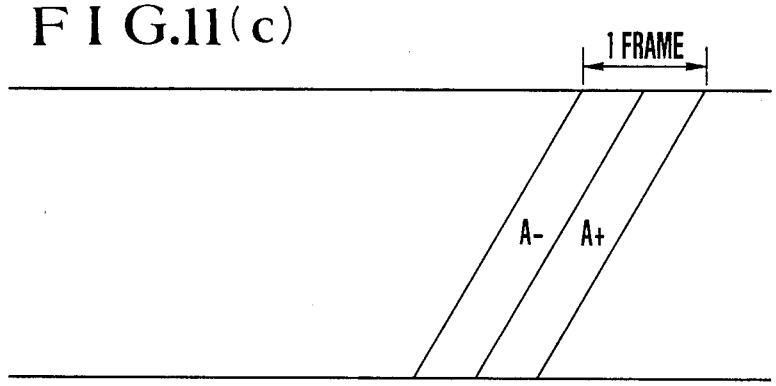

III. Long-Time Mode: The connecting positions of the switches 230 and 259 are at their contacts c. Those of the switches 213 to 216 and 273 to 276 are on the side of their contacts a. A video signal received at the input terminal 201 is subjected to the same processes as in the standard mode through the circuit elements up to the S/I encoding circuit 221. The circuit 221 then supplies the signal to a field drop-out circuit 225. The term "field drop-out" means a known data compressing method in which a field unit of signal data is not transmitted alternately for every field. The amount of data is reduced to half by cutting the vertical resolution down to half. At this point, the data is compressed to ¼ of the amount of data obtained in the high picture quality mode. The output of the field drop-out circuit 225 is time base compressed by a time base compression circuit 291 for the periods as shown in FIG. 12(c). The time base compressed output of the circuit 291 is supplied to the distribution circuit 231 via the contact c of the switch 230. The distribution circuit 231 then produces outputs, which are applied to recording amplifiers 238 and 239 in a cycle as shown in FIG. 12(c) via ECC encoding circuits 232 and 233 and modulation circuits 234 and 235. Then the outputs of the amplifiers 238 and 239 are recorded on the magnetic tape 289 by the recording heads 242 and 243. In this mode, the capstan motor 294 causes the tape to travel, at a speed which is ¼ of the speed obtained in the high picture quality mode. The format of recording on the magnetic tape 289 then becomes as shown in FIG. 11(c).

In reproducing the signal recorded in the long-time mode, the magnetic heads 242 and 243 reproduce the signal record. Reproduced signals from the heads 242 and 243 are supplied to the contacts a of switches 250 and 251 via reproduction amplifiers 246 and 247. The reproduced signals are then processed in the same manner as in the above stated case through detecting circuits 252 and 253, demodulators 254 and 255 and ECC decoding circuits 256 and 257. The two channel signals thus processed are combined into a single channel signal by the composition circuit 258. The signal thus obtained is supplied to the switch 259. The signal is then applied from the contact c of the switch 259 to the time base expansion circuit 293. The circuit 293 expands the time base of the signal by two times. The time base expanded signal is supplied to a field drop-out interpolation circuit 261 to have drop-out fields interpolated. The signal is then applied to the D/A converter 279 via the S/I decoding circuit 265, the interpolation circuit 269 and the contact a of the switch 273. The output of the D/A converter 279 is produced from the output terminal 284.

IV. Four-Channel Mode: Input signals of four channels are recorded and reproduced in this mode. In this mode, the connecting positions of the switches 230 and 259 are at their contacts c while those of the switches 213 to 216 and 273 to 276 are on the side of their contacts a. Four video signals which are received at input terminals 201 to 204 are processed in the same manner as in the case of the long-time mode by A/D converters 206 to 209, sub-sampling circuits 217 to 220, S/I encoding circuits 221 to 223 and field drop-out circuits 225 to 228. The signals thus processed are combined together by the combination circuit 229 into one signal. The signal is produced at the same rate as in the high picture quality mode. The output of the combination circuit 229 is allowed to pass through the contact d of the switch 230 to be processed in the same manner as in the case of the high picture quality mode. Further, the composition circuit 229 is arranged to combine the input signals in such a way as to alternately have the signal of the input terminal 201 located at the first field and the signal of the input terminal 203 at the second field for the pair of heads 242 and 243; and to alternately have the signal of the input terminal 202 located at the first field and the signal of the input terminal 204 at the second field for the other pair of heads 244 and 245.

Figure 13:
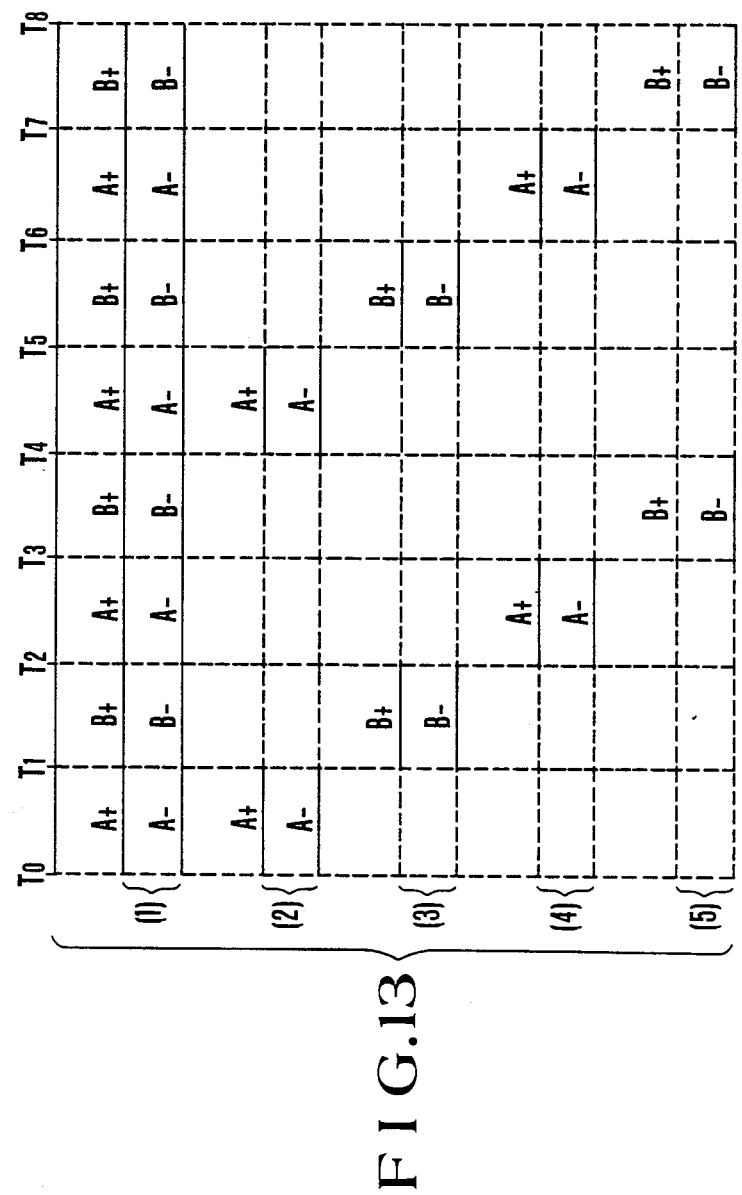
FIG. 13 is a timing chart showing the operation of the digital VTR of FIGS. 10(a) and 10(b).
Figure 14:
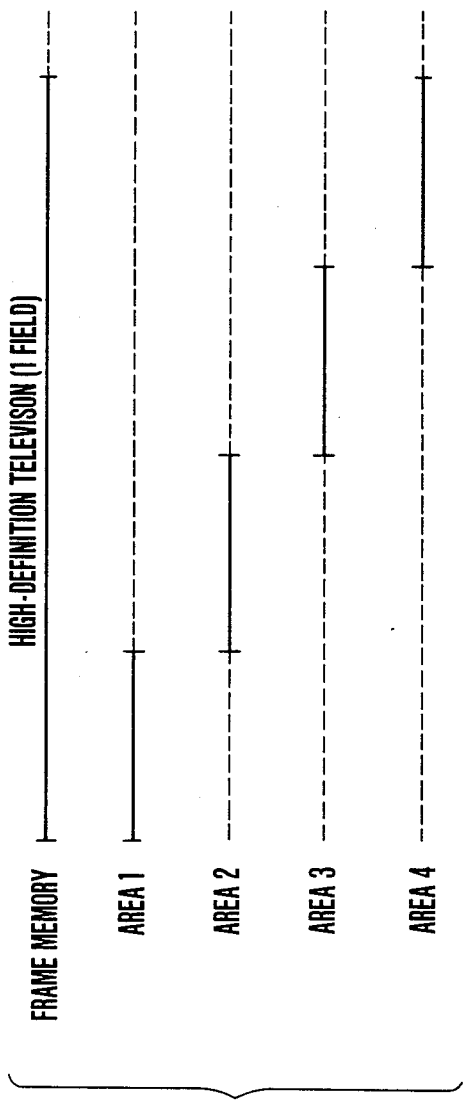
FIG. 14 shows a manner in which a HDTV signal is handled in the digital VTR of FIGS. 10(a) and 10(b).

More specifically, the signal received at the input terminal 201 is time base compressed during the periods between time points T0 and T1, between T4 and T5, —as shown in FIG. 13 for every frame. The signal received at the input terminal 202 is time base compressed during the periods between T1 and T2, T5 and T6, —, for every frame. The signal received at the input terminal 203 is time base compressed during the periods between T2 and T3, between T6 and T7, —. The signal received at the input terminal 204 is time base compressed during the periods between T3 and T4, between T7 and T8, —. The timing of the above stated time base compression is as shown at parts (2) to (5) of FIG. 13. The timing is arranged to coincide with the timing of the data rate obtained in the standard mode as shown at a part (1) of FIG. 13. The format of recording on the magnetic tape 289 is as shown in FIG. 11(a) and is the same as in the case of the high picture quality mode.

For reproduction, the signals are processed in the same manner as in the standard mode by the circuit elements one after another up to the composition circuit 258. The output of the composition circuit 258 is applied via the contact d of the switch 259 to the distribution circuit 260. The distribution circuit 260 supplies the reproduced signals obtained from the heads 242 and 243 to the field drop-out interpolation circuit 261 for the first field and to a field drop-out interpolation circuit 263 for the second field. As regards the reproduced signals obtained from the heads 244 and 245, the distribution circuit 260 supplies them to the field dropout interpolation circuit 262 for the first field and to a field drop-out interpolation circuit 264 for the second field. After that, S/I decoding circuits 265 to 268, interpolation circuits 269 to 272 and D/A, converters 279 to 282 respectively perform the same processing actions as in the case of the long-time mode and outputs of them are produced from output terminals 284 to 287.

V. HD (High-Definition Television) Mode: This mode is provided for recording and reproducing a signal (having 1125 horizontal scanning lines per frame) obtained from a high-definition television camera. The connecting positions of the switches 230 and 259 are at their contacts d while those of the switches 213 to 216 and 273 to 276 are on the side of the contacts b. The high-definition television video signal which is received at an input terminal 205 is sampled by an A/D converter 210 at a frequency of 38 MHz and quantized into eight bits. The digital output of the A/D converter 210 is supplied to a distribution circuit 211. The distribution circuit 211 then writes the output of the A/D converter 210 into a frame memory 212 by time-dividing the effective image plane of one field into four areas. At this moment, about the same amount of data as a data amount obtained by sampling an NTSC (non-interlaced) signal at a frequency of 4 fsc is stored within each of the four areas of the frame memory 212. Signals are read out in four channels from the frame memory 212 and supplied to the sub-sampling circuits 217 to 220 via the switches 213 to 216 at the same data rate as in the case of the four-channel mode described in the foregoing. Then, the S/I encoding circuits 221 to 224, the field drop-out circuits 225 to 228 and the composition circuit 229 perform the same processing actions as in the case of the four-channel mode. The composition circuit 229 produces its output at the same data rate as in the four-channel mode. The output is applied via the contact d of the switch 230 to the distribution circuit 231. After that, the ensuing processing operation is the same as in the case of the four-channel mode.

The signals from the areas 1 and 2 which are included in one field portion of the video signal are supplied alternately to the pair of heads 242 and 243 and the signals from the areas 3 and 4 to the other pair of heads 244 and 245 for every field. The time base compressing periods of the signals from the areas 1, 2, 3 and 4 of the frame memory 212 are in the same relation as in the case of the four-channel mode and are as shown in FIG. 13. The format of recording on the magnetic tape 289 is the same as in the high picture quality mode and is as shown in FIG. 11(a). In other words, one field portion of the video signal from the high-definition television camera is thus divided into four and is recorded in four tracks.

In reproduction, the signal processing operation is performed by circuit elements one after another in the same manner as in the case of the four-channel mode up to the interpolation circuits 269 to 272. After that, the signals processed are supplied to a frame memory 277. At the frame memory 277, the reproduced signals are simultaneously written therein at the frequency of 4 fsc in a manner reverse to the frame memory 212. Then, the signals are read out in a time sharing manner according to a clock signal for the HD mode (about 38 MHz). The signals read out are combined into one frame corresponding to the high-definition television system through the composition circuit 278. The signal thus obtained is supplied to an output terminal 288 via a D/A converter 283.

In an example of arranging a system by connecting a camera or tuner and a TV monitor to the digital VTR of the embodiment described, the camera or tuner is connected to the input terminal 201 or the input terminals 201 to 204 as applicable according to the one of the above stated operation modes selected. In the event of a high-definition television camera or a tuner corresponding to the high-definition television camera, it is connected to the input terminal 205. In performing a reproducing operation, a TV monitor is connected to the output terminal 284 or to the output terminals 284 to 287 or a monitor corresponding to the high-definition television system is connected to the output terminal 288. Further, in application examples relative to the four-channel and HD modes, the different images of four NTSC (interlaced) image planes may be displayed in a quartered state on an image plane of a monitor device for the high-definition television; or an image produced from a high definition television camera may be divided and displayed on four monitor units arranged for the NTSC (interlaced) signals.

What is claimed is:

1. A digital information signal recording apparatus comprising:
   (a) first signal generating means for generating a digital information signal of one channel having a given bit rate;
   (b) second signal generating means for generating digital information signals of n channels having a bit rate which is 1/n of said given bit rate, n being an integer which is at least 2;
   (c) composition means for combining said digital information signals of n channels generated by said second signal generating means to generate a composite information signal of said given bit rate;
   (d) selection means for selectively outputting one of said composite digital information signal and said digital information signal of one channel generated by said first signal generating means; and
   (e) recording means for recording on a recording medium a digital signal output from said selection means.

2. An apparatus according to claim 1, wherein said first signal generating means includes input means for receiving a digital information signal, and wherein said second signal generating means includes n input means for receiving digital information signals of n channels, having the same bit rate as that of the digital information signal received by said input means.

3. An apparatus according to claim 2 wherein said input means of said first signal generating means is arranged to serve also as one of said in input means of said second signal generating means.

4. An apparatus according to claim 2. wherein said second signal generating means further includes data compressing means for compressing to 1/n the amount of data of each of said digital information signals of n channels received by said n input means.

5. An apparatus according to claim 1, wherein said selection means is arranged to selectively output one of said composite digital information signal, said digital information signal of one channel generated by said first signal generating means, and one of said digital information signals of n channels generated by said second signal generating means.

6. An apparatus according to claim 5 wherein said recording means includes head means including at least one pair of heads which have different azimuth angles from each other and are arranged to rotate adjacently to each other, and signal processing means arranged to receive a digital signal output from said selection, means and to supply a recording signal to said head mean such that said digital signal is periodically recorded by said pair of heads with a given amount of data of said digital signal recorded at a time.

7. An apparatus according to claim 6, wherein said signal processing means is arranged to supply the recording signal including said given amount of data to said head means for every predetermined period when said selection means is producing said composite digital information signal or said digital information signal of one channel generated by said first signal generating means, and to supply the recording signal including said given amount of data to said head means for every period which is n times as long as said predetermined period when said selection means is producing one of said digital information signals of n channels generated by said second signal generating means.

8. An apparatus according to claim 1, wherein said first signal generating means includes first input means for receiving a digital information signal, and wherein said second signal generating means includes a second input means for receiving a digital information signal having a bit rate which is n times as much as that of said digital information signal received by said first input means.

9. An apparatus according to claim 8, wherein said second signal generating means further includes distributing means for distributing to n channels said digital information signal received by said second input means.

10. An apparatus according to claim 9, wherein said second signal generating means further includes data compressing means for compressing to 1/n the amount of data of each of digital information signals of n channels obtained from said distributing means.

11. A digital information signal recording apparatus comprising:
  (a) first signal generating means for generating a digital information signal of one channel having a given bit rate;
  (b) second signal generating means for generating digital information signals of n channels having said given bit rate, n being an integer which is at least 2;
  (c) composition means for combining said digital information signals of n channels generated by said second signal generating means to generate a composite digital information signal having a bit rate which is n times as much as said given bit rate;
  (d) selection means for selectively outputting one of said composite digital information signal and, said digital information signal of one channel generated by said first signal generating means; and
  (e) recording means for recording on a recording medium a digital signal output from said selection means.

12. An apparatus according to claim 11, wherein said recording means includes head means including at least one pair of heads which have different azimuth angles from each other and are arranged to rotate adjacently to each other, and signal processing means arranged to receive a digital signal output from said selection means and to supply a recording signal to said head means such that said digital signal is periodically recorded by said pair of heads with a given amount of data of said signal recorded at a time.

13. An apparatus according to claim 12, wherein said signal processing means is arranged to supply the recording signal including said given amount of data to said head means for every predetermined period when said selection means is producing said composite digital information signal, and to supply the recording signal including said given amount of data to said head means for every period which is n times as long as said predetermined period when said selection means is producing said digital information signal of one channel generated by said first signal generating means.

14. An apparatus according to claim 11, wherein first signal generating means includes input means for receiving a digital information signal, and wherein said second signal generating means includes n input means for receiving digital information signals of n channels having the same bit rate as that of said digital information signal received by said input means.

15. An apparatus according to claim 14, wherein said input means of said first signal generating means is arranged to serve also as one of said n input means of said second signal generating means.

16. An apparatus according to claim 14, wherein said first signal generating means further includes data compressing means for compressing the amount of data of said digital information signal received by said input means, and wherein said second signal generating means further includes data compressing means for compressing the amount of data of each of said digital information signals of n channels received by said n input means.

17. An apparatus according to claim 16, further comprising third signal generating means for generating a digital information signal of one channel having a bit rate which is n times as much as said given bit rate.

18. An apparatus according to claim 17, wherein said third signal generating means is arranged to generate a digital information signal of one channel having a bit rate which is n times as much as said given it rate by using said digital information signal received by said input means of said first signal generating means.

19. An apparatus according to claim 7, wherein said selection means is arranged to selectively output one of said composite digital information signal, said digital information signal of one channel generated by said first signal generating means, and said digital information signal of one channel generated by said third signal generating means.

20. An apparatus according to claim 11, wherein said first signal generating means includes first input means for receiving a digital information signal, and wherein said second signal generating means includes second input means for receiving a digital information signal having a bit rate which is n times as much as that of said digital information signal received by said first input means.

21. An apparatus according to claim 20, wherein said second signal generating means further includes distributing means for distributing to n channels said digital, information signal received by said second input means.

22. A digital information signal recording apparatus comprising:
(a) first input means for receiving a first digital information signal having a given bit rate;
(b) second input means for receiving a second digital information signal having a bit rate which is n times as high as said given bit rate, n being an integer which is at least 2;
(c) distributing means for distributing said second digital information signal received by said second input means into n channels;
(d) data compressing means for compressing to 1/n the amount of data of each of said digital information signals of n channels obtained by said distributing means;
(e) composition means for combining said digital information signals of n channels compressed by said data compressing means to generate a composite digital information signal of said given bit rate;
(f) selection means for selectively outputting one of said composite digital information signal and said digital information signal of one channel received by said first input means; and
(g) recording means for recording on a recording medium a digital signal output from said selection means.

23. A digital information signal recording apparatus comprising:
(a) first input means for receiving digital information signals of n channels having a given bit rate;
(b) second input means for receiving a second digital information signal having a bit rate which is n times as high as said given bit rate, n being an integer which is at least 2;
(c) distributing means for distributing said second digital information signal received by said second input means to n channels;
(d) selection means for selectively outputting one of said digital information signals of n channels obtained by said distributing means and said digital information signals of n channels received by said first input means;
(e) composition means for combining digital information signals of n channels output from said selection means to generate a composite digital information signal of said given bit rate; and
(f) recording means for recording said composite digital information signal on a recording medium.

* * * * *